(12) United States Patent
Mueller et al.

(10) Patent No.: US 11,241,665 B2
(45) Date of Patent: Feb. 8, 2022

(54) METHOD FOR PRODUCING A PLASTIC GRANULATE

(71) Applicant: Maag Automatik GmbH, Grossostheim (DE)

(72) Inventors: Horst Mueller, Leidersbach (DE); Stefan Deiss, Harxheim (DE); Frank Gloeckner, Aschaffenburg (DE); Reinhardt-Karsten Muerb, Aschaffenburg (DE)

(73) Assignee: MAAG AUTOMATIK GMBH, Grossostheim (DE)

( * ) Notice: Subject to any disclaimer, the term of this patent is extended or adjusted under 35 U.S.C. 154(b) by 181 days.

(21) Appl. No.: 15/776,779

(22) PCT Filed: Oct. 17, 2016

(86) PCT No.: PCT/EP2016/074886
§ 371 (c)(1),
(2) Date: May 16, 2018

(87) PCT Pub. No.: WO2017/084821
PCT Pub. Date: May 26, 2017

(65) Prior Publication Data
US 2018/0333693 A1    Nov. 22, 2018

(30) Foreign Application Priority Data
Nov. 16, 2015    (DE) ............... 10 2015 119 787.1

(51) Int. Cl.
*B29B 9/06*    (2006.01)
*B29B 9/16*    (2006.01)
(Continued)

(52) U.S. Cl.
CPC ............... *B01J 2/20* (2013.01); *B29B 9/065* (2013.01); *C08G 63/78* (2013.01); *F26B 5/16* (2013.01);
(Continued)

(58) Field of Classification Search
CPC . B01J 2/20; C08G 63/78; B29B 9/065; B29B 2009/168; B29B 2009/165; F26B 5/16; F26B 2200/12; F26B 2200/08
See application file for complete search history.

(56) References Cited

U.S. PATENT DOCUMENTS 7,204,945 B2    4/2007    Bonner
7,521,522 B2    4/2009    Otto et al.
(Continued)

FOREIGN PATENT DOCUMENTS

| CN | 1671766 A | 9/2005 |
|---|---|---|
| CN | 1852799 A | 10/2006 |

(Continued)

OTHER PUBLICATIONS

Search Report for German Patent Application No. 10 2015 119 787.1 dated Nov. 16, 2015, 8 pages.
(Continued)

Primary Examiner — Timothy Kennedy
Assistant Examiner — Olukorede Esan
(74) Attorney, Agent, or Firm — Womble Bond Dickinson (US) LLP; Joseph Bach, Esq.

(57) ABSTRACT

The invention relates to a method for producing a plastic granulate (16), in which a process fluid (12) is contained in a process chamber (10) where an underwater granulation takes place and the process fluid in the process chamber has a temperature greater than 120° C. A process pressure of at least 2.0 bar is obtained in the process chamber, at which a granulation of the plastic strands (14) into plastic granulate
(Continued)

occurs. From the process chamber, a mixture (18) of process fluid and plastic granulate is diverted into a first cooling zone (25) during cooling of the plastic granulate, while maintaining the process pressure. In a first separating device (22), the plastic granulate is separated from the process fluid under process pressure. In the process chamber, the process fluid has a temperature in the range from 120° C. to 160° C., and the process pressure obtained there is greater than the pressure of the vapour pressure curve of the process fluid. After separation from the process fluid in the first separating device, the plastic granulate is fed continuously in a line to a dealdehydization container (46).

19 Claims, 3 Drawing Sheets

(51) Int. Cl.
  *B01J 2/20* (2006.01)
  *C08G 63/78* (2006.01)
  *F26B 5/16* (2006.01)
(52) U.S. Cl.
  CPC ... *B29B 2009/165* (2013.01); *B29B 2009/168* (2013.01); *F26B 2200/08* (2013.01); *F26B 2200/12* (2013.01)

(56) References Cited

U.S. PATENT DOCUMENTS

| | | | |
|---|---|---|---|
| 7,993,557 B2 | 8/2011 | Hanimann et al. | |
| 8,079,158 B2 | 12/2011 | Ekart et al. | |
| 8,293,850 B2 | 10/2012 | Cavaglia | |
| 2005/0056961 A1* | 3/2005 | Bonner | B29B 9/06 264/143 |
| 2005/0272906 A1* | 12/2005 | Cavaglia | B01J 19/28 528/272 |
| 2006/0042113 A1* | 3/2006 | Ekart | F26B 5/08 34/58 |
| 2006/0165564 A1* | 7/2006 | Cavaglia | B01J 8/125 422/129 |
| 2007/0073037 A1* | 3/2007 | Otto | B29B 9/16 528/480 |
| 2009/0218052 A1 | 9/2009 | DeBruin et al. | |
| 2011/0245452 A1* | 10/2011 | Ionita | F26B 17/00 528/308.1 |
| 2012/0256341 A1* | 10/2012 | Gloeckner | B29B 9/16 264/140 |
| 2016/0016332 A1* | 1/2016 | Wilhelmi | C08G 63/80 264/143 |

FOREIGN PATENT DOCUMENTS

| | | |
|---|---|---|
| CN | 101296788 A | 10/2008 |
| CN | 101438116 A | 5/2009 |
| CN | 101842208 A | 9/2010 |
| DE | 102006058642 A1 | 6/2008 |
| DE | 102007040135 A1 | 2/2009 |
| DE | 102008062480 A1 | 6/2010 |
| DE | 102006027176 B4 | 8/2015 |
| DE | 102015119787 A1 | 5/2017 |
| EP | 2433771 A1 | 3/2012 |
| EP | 2712881 A1 | 4/2014 |
| EP | 2361174 B1 | 11/2014 |
| TW | 201034827 A | 10/2010 |
| WO | 2006133469 A1 | 12/2006 |
| WO | 2016010678 A1 | 1/2016 |

OTHER PUBLICATIONS

International Search Report and Written Opinion for PCT/EP2016/074886 dated Jan. 30, 2017, 23 pages.
Office Action for Chinese Patent Application No. 201680066782.6 dated Nov. 1, 2019.
Second Office Action from the Chinese National Intellectual Property Administration for Chinese Patent Application No. 201680066782.6, dated Jun. 9, 2020, 17 pages.

\* cited by examiner

METHOD FOR PRODUCING A PLASTIC GRANULATE

This application is the national phase of International Application No. PCT/EP2016/074886, filed on Oct. 17, 2016, which claims priority to and the benefit of German Patent Application No. 102015119787.1, filed on Nov. 16, 2015, the disclosures of which are hereby incorporated by reference in their entireties.

The invention relates to a method for producing a plastic granulate of the type specified in the preamble of claim 1.

EP 2 361 174 B1 discloses a method for producing a plastic granulate having a high softening temperature, i.e. above 120° C. Plastic granulates of this kind can be polycarbonate, polycarbonate blends, polystyrene, high-temperature thermoplastics, for example. A process fluid is contained in a process chamber. The process chamber is partially delimited by a perforated plate for generating strands of liquid plastic. In the process chamber, a cutting device cooperates with the perforated plate for the plastic strands emerging from the perforated plate. This produces a mixture of process fluid and granulate material. The process fluid has a temperature of more than 120° C. The pressure prevailing in the process chamber is higher than 2 bar. The mixture of process fluid and granulate material then passes through a cooling zone, with the pressure being maintained. The pressurized granulate material is then separated from the process fluid in a separation device and passed through a pressure lock. This method has generally proven to be useful. However, the quality of the plastic granulate materials is still too low for further processing for certain applications.

DE 10 2006 027 176 B4 discloses a method for producing a plastic granulate having a low acetaldehyde content from a highly viscous polyester melt having an intrinsic viscosity of between 0.6 and 1.0 dl/g. For this purpose, the molten polyester strand is cut up under water at a temperature of at least 90° C. The accompanying water is subsequently separated from the plastic granulate, during which step the plastic granulate should cool down as little as possible to ensure that the plastic granulate has a temperature of at least 130° C. after it has been separated from the water. The dewatered plastic granulate thus obtained after water removal is then transferred into a dealdehydization container where it is treated by means of a purge air stream having an entry temperature of between 180° C. and 200° C. The plastic granulate is either introduced directly into the dealdehydization container or by means of a dosing device. This is to reduce the amount of equipment used for the process and to reduce operating costs. In addition, the particularly high quality standards for polyester used for packaging, with regard to its viscosity, color, acetaldehyde content as well as melting behavior are to be met or even exceeded. Here, too, the disadvantage of this method is that the quality of the plastic granulate is not satisfactory for certain applications.

It is the object of the invention to provide a method for producing a plastic granulate which produces a plastic granulate of a higher quality as regards viscosity, color, acetaldehyde content, melt characteristics and the like. In particular, the equipment required is to be kept to a minimum and the method is to be performed at as low as possible operating costs.

This object is accomplished by the features of claim 1.

Disclosed in the dependent claims are advantageous embodiments of the invention.

The invention is based on the finding that it is both the process parameters for plastic granulation, which are responsible for nucleation for influencing crystallization as well as for the crystallization as such, and the dealdehydization of the plastic granulates which considerably affect the quality of the plastic granulates. Consequently, both measures, when used in combination with adapted and coordinated parameters, will yield a better overall quality of the plastic granulates. Moreover, this provides further possibilities for optimizing the operating costs of the method and for improving the quality of the plastic granulates.

The invention thus provides a method for producing a plastic granulate, in which a process fluid is contained in a process chamber. Underwater granulation is performed in the process chamber. The process fluid contained in the process chamber has a temperature ranging from above 120° C. to a maximum of 160° C. Moreover, the process pressure prevailing in the process chamber is higher than the pressure of the water vapor pressure curve of the process fluid (12), but is at least 2.0 bar. At this process pressure, the plastic strands will be granulated to produce a plastic granulate. From the process chamber, a mixture of process fluid and plastic granulate is then diverted into a first cooling zone during cooling of the plastic granulate, while maintaining constant process pressure and temperature in the first cooling zone. Subsequently, the plastic granulate is separated from the process fluid in a first separating device at this process pressure. Next, the plastic granulate is fed continuously in a line to a dealdehydization container. In the first cooling zone, an optimized cooling temperature makes specific nucleation, i.e. generating crystallization seeds, possible on the surface of the plastic granulate, with the result that the plastic granulate offers optimized conditions for crystallization and can be fed to the dealdehydization container.

Preferably, the process chamber is partially delimited by a perforated plate for producing strands of liquid plastic. In the process chamber, a cutting device cooperates with the perforated plate for the plastic strands exiting from the perforated plate, and underwater granulation occurs in the process fluid by the action of the cutting device on the perforated plate in the process chamber. It has turned out that these conditions will produce surface shapes which are advantageous for the further processing of the plastic granulate. Moreover, this also reduces the number of vacuoles in the plastic granulate produced with this method.

According to one embodiment, following the first separating device, the plastic granulate is directly fed along a crystallization zone to a dealdehydization container by means of dry gas, in particular dry air. This two-stage cooling of the plastic granulate on the one hand improves the surface quality of the plastic granulate and on the other hand allows the crystallization of the plastic granulate to be specifically influenced by the dry air parameters and thus optimized. Moreover, this prevents the plastic granules from sticking to each other.

In the dealdehydization container, the plastic granulate is treated with a purge gas, in particular purge air, so as to reduce the acetaldehyde content of the plastic granulate. The use of purge gas is particularly easy and considerably reduces operating costs, especially when purge air is used.

Preferably, the dry gas is introduced into the dealdehydization container together with the plastic granules and serves as an additional purge gas. Here, the dry gas serves both as a transport medium for feeding the plastic granulate to the dealdehydization container and as a treatment medium in the dealdehydization container for the plastic granulate introduced into it, thus also reducing the required equipment and energy.

In one embodiment of the invention, the plastic granulate is introduced into the dealdehydization container at a surface temperature of between 165° C. and 185° C. From the start, the plastic granulate thus has a temperature which favors the dealdehydization process in the dealdehydization container.

Preferably, the dry gas entrains the plastic granules after the first separating device with a dew point of between −25° C. and −40° C. This prevents water from condensing on the plastic granules during transport, which would have an undesired and detrimental effect on crystallization.

In particular, the dry gas entrains the plastic granules after the first separating device at a temperature of between 180° C. and 210° C., which favors the crystallization process during transport. Selecting the suitable transport speed and/or length of the crystallization zone will allow determining the degree of crystallization of the plastic granulates as they enter the dealdehydization container.

The underwater granulation preferably produces plastic granules having a weight ranging between 8 mg and 36 mg, in particular between 12 mg and 24 mg, as they exit the dealdehydization container. The smaller the plastic granules, the better for the diffusion processes. In particular, this will make it easier to remove the aldehyde from the plastic granules. However, smaller plastic granules will also cool down faster, which again has a detrimental effect on crystallization. Consequently, the value indicated is a compromise between the contradictory requirements made on the plastic granules during the process. The weight values stated relate to the average weight of the plastic granules, with the maximum tolerance of the weight of the plastic granules being 10%. This has the advantage that the plastic granules will crystallize homogenously, making their further processing easier.

In order to further optimize the equipment required, part of the dry gas is also used as the purge gas for the dealdehydization container, by diverting part of the dry gas, in particular before the crystallization zone, and feeding it to the dealdehydization container as purge gas. Consequently, only one gas processing unit is required, i.e. a device for processing the dry gas. This further optimizes the equipment and energy required for the method.

In a simple manner, a closed cycle is thus produced and energy from the purge gas can be made avail-able to the further process by supplying—through an outlet on the dealdehydization container—a process gas consisting of the dry gas—additional purge gas—introduced into the dealdehydization container together with the plastic granules and of the purge gas introduced into the dealdehydization container, in particular together with a fresh gas added to yield the required amount of dry gas, to a gas processing unit which processes said gas as a dry gas and supplies said gas to the plastic granules again downstream of the first separating device.

Downstream of the first separating device, the method can be operated further in two different alternative versions, for example.

On the one hand, it is possible to reduce pressure downstream of the first separating device and up-stream of the crystallization zone to an extent that will ensure a predefined dew point of the dry gas. This has the advantage that in particular the crystallization zone and the dealdehydization container can be of a simpler design since there is no process pressure anymore.

On the other hand, however, it is also possible to maintain a pressure of above 2 bar in the dry gas and/or purge gas in the region from the first separating device up to the dealdehydization container and in the dealdehydization container, and to reduce pressure downstream of the dealdehydization container, in particular to atmospheric pressure. Because crystallization and dealdehydization are performed under pressure, this expands the parameter range defined by physical limits. Preferably, the pressure prevailing in the dealdehydization container is lower than 10 bar.

Pressure reduction downstream of the dealdehydization container can be performed by a rotary valve or a lock or via an intermediate chamber having a slide valve at its input and a slide valve at its output and alternatingly opening said valves.

According to an advantageous embodiment of the invention, during dealdehydization, the pressure prevailing in the dealdehydization container is maintained constant in the range of the dew point at atmospheric pressure of less than 0° C.

After dealdehydization, the plastic granules can be supplied to an additional cooling zone with a cooling fluid, in which the plastic granules are cooled down to below 65° C., at a cooling fluid temperature of less than 40° C.

Preferably, the cooling fluid has a loading density of more than 30% by weight of plastic granules in the additional cooling zone.

More specifically, the plastic granules consist of a semi crystalline thermoplastic polyester or copolyester, for example polyethylene terephthalate, since the above mentioned advantages will produce particularly good results here.

Additional advantages, features and possible applications of the present invention may be gathered from the description which follows, in which reference is made to the embodiments illustrated in the drawings.

Throughout the description, the claims and the drawings, those terms and associated reference characters are used as are listed in the List of Reference Characters below. In the drawings:

Figure 1:
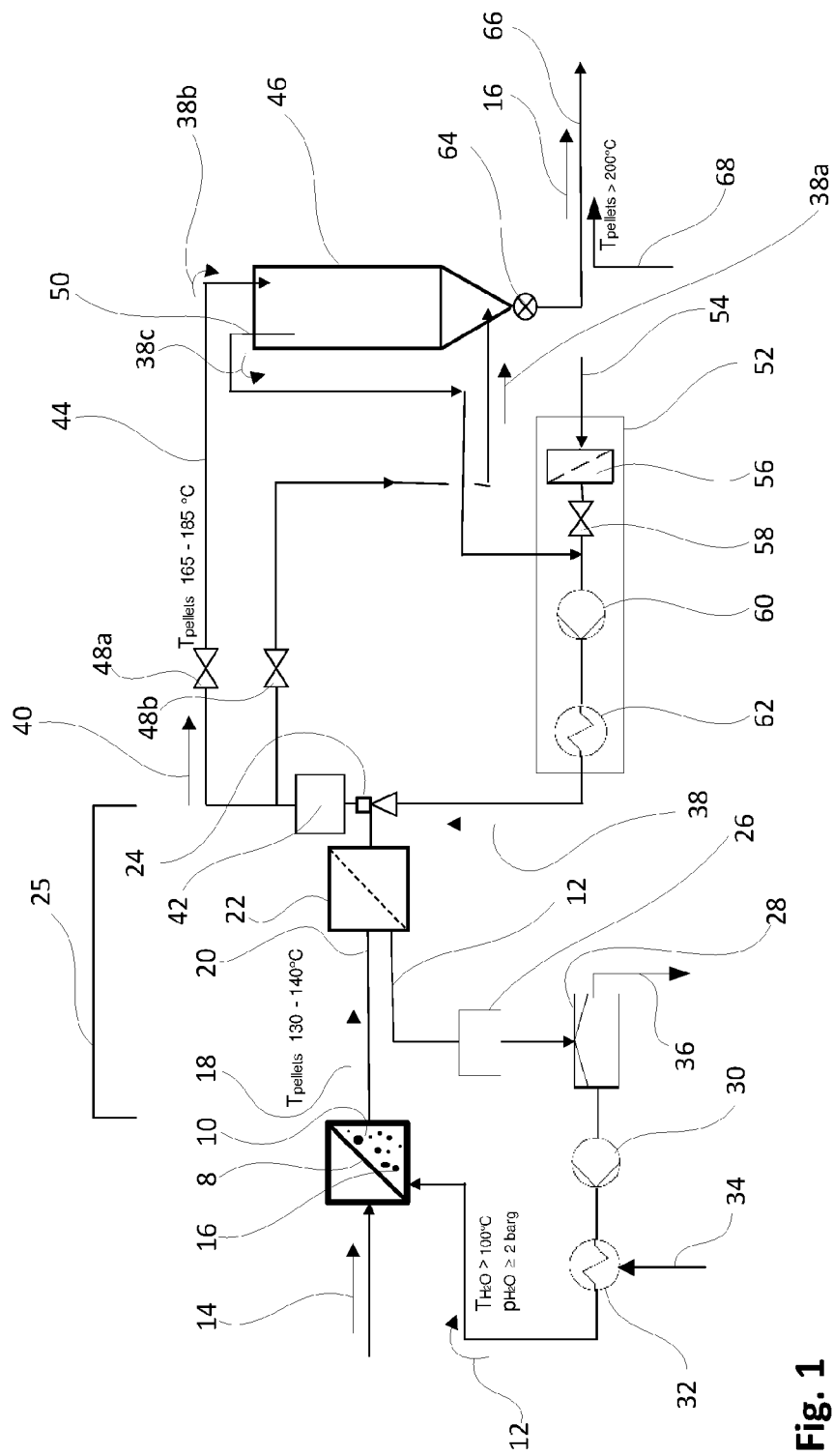
FIG. 1 is a schematic view of a method for producing plastic granulate according to a first embodiment.

FIG. 1 is a schematic view of a method according to the invention. In a process chamber 10, a blade rotor is arranged which is associated with a perforated plate 8. The blade rotor and the perforated plate 8 together form a conventional underwater granulator. Successively, hot process fluid 12, usually hot process water, is supplied to the process chamber 10. Moreover, a molten plastic flow 14 is introduced into the process chamber 10 via the perforated plate 8, which plastic is then discharged from the perforated plate 8 in the form of plastic strands and cut into plastic granules 16 by the blade rotor. This yields a mixture 18 of plastic granules 16 and process water 12.

The molten plastic flow consists of a plastic, for example thermoplastic polyester or copolyester, for example polyethylene terephthalate. Moreover, the molten plastic flow 14 is pressed through the perforated plate 8 as a function of the speed of the blade rotor. The cool-down areas can be determined by appropriately adapting the speed at which the molten plastic passes through the perforated plate 8 in relation to the rotational speed of the blade rotor as well as to the temperature of the process water 12. The preferred option is cooling simply through convection since this will yield the best surface quality and thus also the best quality of the plastic granulate 16.

In the process chamber 10, the process water 12 has a temperature ranging between 120° C. and 160° C. Moreover, the process pressure prevailing in the process chamber and in the sections of the process described hereinafter is higher than the pressure of the vapor pressure curve of the process water 12, but is at least 2.0 bar.

The plastic granulate 16 is fed to a mixing zone 24 via a line 20 and a separating device 22 which latter separates the components plastic granulate 16 and process water 12 of the mixture 18 from one another. The zone extending from the process chamber 10 via the line 20 and the separating device 22 constitutes the first cooling zone 25.

The process water 12 separated from the mixture 18 in the separating device 22 is fed to a process water tank 26. From there, the process water 12 is fed to a heat exchanger 32 via a filter 28, a pump 30, which heat exchanger 32 reheats the process water 12 to the required process temperature necessary in the process chamber 10. For this purpose, heating medium 34 is supplied to the heat exchanger 32. Filter residues 36 are discharged from the filter 28. The process water 12 heated in the heat exchanger 32 is then returned to the process chamber 10.

In the mixing area 24, the plastic granulate 16 is mixed with dry air 38 to form a mixture 40. The dry air 38 entrains the plastic granules 16 in the mixing zone 24 downstream of the first separating device 22 with a dew point of between −25° C. and −40° C. The temperature of the dry air 38 is between 180° C. and 210° C. The mixture 40 is fed to a pressure lock 42, which may take the form of an impeller lock for example, where the pressure level is reduced to ambient pressure. The dry air 38 continues to have a predefined dew point. The mixture 40 is fed to a dealdehydization container 46 via a valve 48a and a crystallization zone 44. The valve 48a is used to control the speed at which the mixture passes through the crystallization zone 44.

Downstream of the pressure lock 42, dry air 38 is diverted and fed as purge air 38a to the lower part of the dealdehydization container 46. A valve 48a is used to regulate/control the amount to be diverted.

The mixture 40 of plastic granulate 16 and dry air 38 passes through the crystallization zone 44. The length of the crystallization zone 44 but also the flow rate of the dry air 38 are used to determine the dwell time in the crystallization zone 44. Before entering the dealdehydization container 46, the plastic granules 16 have a surface temperature of between 165° C. and 185° C. The mixture 40 of plastic granules 16 and dry air 38 enters the dealdehydization container 46. Here, this portion of the dry air 38 is used as additional purge air 38b.

In its upper part, the dealdehydization container 46 has an outlet 50 which is used to re-supply the purge air 38a and the additional purge air 38b to a dry air treatment device 52. The dry air treatment device 52 has a fresh air supply 54, a fresh air filter 56, a control/regulating valve 58 for setting the required amount of fresh air, a pump 60 as well as a processing unit 62 having temperature control and dehumidification. This is used to remove acetaldehyde and excess water through absorption on a molecular sieve or by using similar substances and processes known to the person of skill in the art. In this step, acetaldehyde largely decomposes into water and carbon dioxide. The purge air 38c exiting the dealdehydization container 46 via outlet 50 and consisting of purge air 38a and 38b is supplied to the fresh air 54 downstream of the control/regulating valve 58. The purge air 38c and the fresh air 54 form the new dry air 38, thus closing the cycle.

The plastic granules 16 exit the dealdehydization container 46 through a lock 64, at a temperature of more than 200° C. The plastic granulate 16 has a granule weight of between 8 mg and 36 mg, in particular of between 12 mg and 24 mg. Underwater granulation in the process chamber 10 is appropriately adapted thereto. The weight of the plastic granules 16 deviates by 10% at the most from a weight average of the plastic granules. The term weight average refers to a statistically significant proportion of plastic granules 16 during a small time slot downstream of the dealdehydization container 46, i.e. the process section.

Downstream of the dealdehydization container 46, the plastic granulate 16 is supplied to an additional cooling zone 66 with a cooling fluid, in which the plastic granulate 16 is cooled down to a temperature of less than 65° C., with the cooling fluid temperature being less than 40° C. In the additional cooling zone 66, the cooling fluid has a loading density of more than 30% by weight of plastic granules 16.

The plastic granulate 16 consists of a semi-crystalline thermoplastic polyester or copolyester, for example polyethylene terephthalate.

Figure 2:
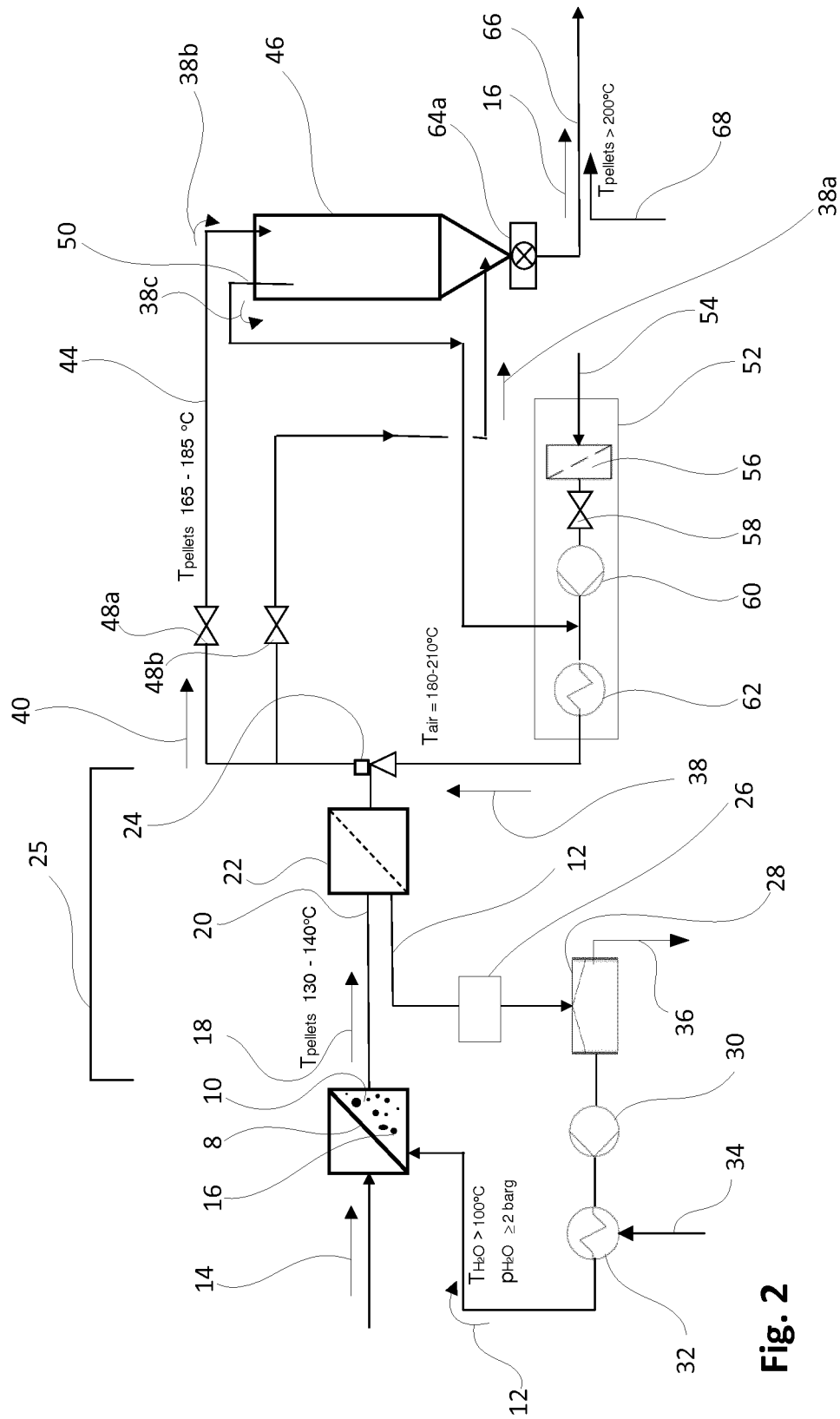
FIG. 2 is a schematic view of a method for producing plastic granulate according to a second embodiment.
Figure 3:
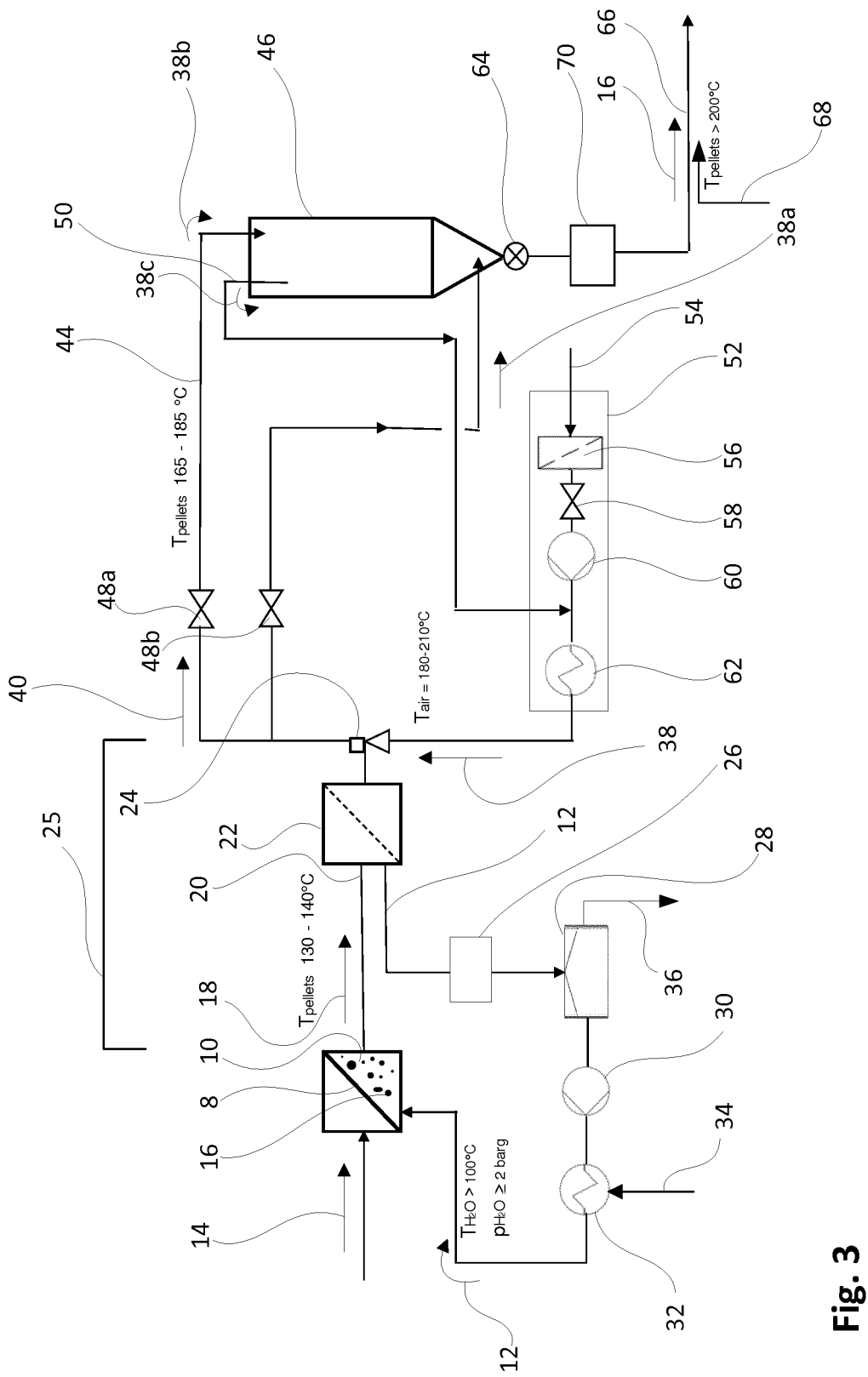
FIG. 3 is a schematic view of a method for producing plastic granulate according to a third embodiment.

FIGS. 2 and 3 each illustrate another embodiment. In each case, the process pressure is maintained until the plastic granules 16 exit the dealdehydization container 46.

For this reason, the pressure reduction will only occur downstream of the dealdehydization container 46. The purge air 38c will therefore only be supplied to the fresh air 54 downstream of the high-pressure fan 60 since the purge air 38c is still pressurized. Starting from the first separating device 22 and up to the dealdehydization container 46, a pressure of more than 2 bar is maintained in the dry air 38. Pressure will only be reduced downstream of the dealdehydization container 46, in particular to atmospheric pressure. The pressure in the dealdehydization container 46 is lower than 10 bar. During dealdehydization in the dealdehydization container 46 under pressure, the dew point at atmospheric pressure of less than 0° C. is maintained constant.

As seen in FIG. 2, pressure reduction is performed by means of a cell wheel lock 64a. As an alternative, it can also be performed using a lock, or an intermediate chamber having a slide valve at its inlet and a slide valve at its outlet and alternately opening said slide valves.

As seen in FIG. 3, a pressure lock 70 is provided downstream of the lock 64. Apart from this, the sequence of the processes is the same and the same devices are provided in a line in the manner de-scribed with reference to FIG. 1. One advantage of the method also is the production of the plastic granules in a line, i.e. continuously and not sequentially.

Moreover, the direct crystallization described in the method saves energy because firstly, energy contained in the molten plastic is used for crystallization, and secondly, this eliminates the need for inter-mediate storage.

Furthermore, its reduced aldehyde content makes the plastic granulate better compatible with products it comes into contact with.

The method according to the invention considerably improves the quality of the plastic granules. It ensures a constantly high viscosity and/or high molecular weight of the plastic. This thus makes the method far better suited for producing higher-quality products.

LIST OF REFERENCE CHARACTERS 8 perforated plate
10 process chamber
12 process fluid, process water
14 molten plastic 16 plastic granulate
18 mixture of process fluid 12 and plastic granulate 16
20 line
22 separating device
24 mixing chamber
25 first cooling zone
26 process water tank
28 first filter
30 first pump
32 first heat exchanger
34 heating medium
36 filter residues
38 dry air
38a purge air
38b purge air
38c purge air
40 mixture of plastic granulate 16 and dry air 38
42 pressure lock
44 crystallization zone
46 dealdehydization container
48a control/regulating valve
48b control/regulating valve
50 outlet of dealdehydization container 46
52 dry air treatment device
56 fresh air filter
58 fresh air control/regulating valve
60 high-pressure fan
62 processing unit consisting of temperature control and dehumidification units
64 lock of the dealdehydization container 46
64a cell wheel lock
66 additional cooling zone
68 additional cooling fluid
70 pressure lock

The invention claimed is:

1. Method for producing a plastic granulate, in which a process fluid is contained in a process chamber in which chamber an underwater granulation takes place and the process fluid in the process chamber has a temperature which is in a temperature range between 120° C. and 160° C., a process pressure of at least 2.0 bar prevails in the process chamber and at which process pressure a granulation of the plastic strands into plastic granulate is performed, a mixture of process fluid and plastic granulate is diverted from the process chamber into a first cooling zone while optimizing the cooling temperature to cause nucleation forming crystallization seeds on the surface of the plastic granulate during cooling of the plastic granulate, in a first separating device, the plastic granulate is separated from the process fluid under process pressure, wherein the process pressure is maintained in said first cooling zone, the process pressure prevails in the process chamber is higher than the pressure of the vapor pressure curve of the process fluid, and after separation from the process fluid in the first separating device, the plastic granulate is mixed with dry gas in a mixing zone and is fed continuously in a line to a dealdehydization container in which the plastic granulate is treated with a purge gas in order to reduce the acetaldehyde content of the plastic granulate, wherein the plastic granulate is fed through a crystallization zone forming a second cooling stage of the plastic granulates, to the dealdehydization container by means of the dry gas and wherein part of the dry gas is diverted downstream of the mixing zone but upstream of the crystallization zone and is fed as purge gas to a lower part of the dealdehydization container and remainder of the dry gas is fed into the dealdehydization container together with the plastic granulate, and a valve is used to regulate the amount of dry gas to be diverted.

2. Method according to claim 1, wherein the process chamber is partially delimited by a perforated plate for generating molten plastic strands, a cutting device is arranged in the process chamber and cooperates with the perforated plate for cutting up the plastic strands discharged from the perforated plate, and that said underwater granulation is performed in the process fluid by the cutting device acting on the perforated plate in the process chamber.

3. Method according to claim 1, wherein the dry gas comprises dry air.

4. Method according to claim 1, wherein the dry gas is introduced into the dealdehydization container together with fresh gas.

5. Method according to claim 1, wherein the plastic granulate, when it is introduced into the dealdehydization container, has a surface temperature of between 165° C. and 185° C.

6. Method according to claim 5, wherein the dry gas has a dew point of between −25° C. and −40° C. as it entrains the plastic granules downstream of the first separating device.

7. Method according to claim 6, wherein the dry gas has a temperature of between 180° C. and 210° C. as it entrains the plastic granules downstream of the first separating device.

8. Method according to claim 1, wherein the underwater granulation produces plastic granules which, having passed through the dealdehydization container, have a weight of between 8 mg and 36 mg.

9. Method according to claim 1, wherein the dry gas forms a closed cycle by returning from the dealdehydization container to a gas processing unit.

10. Method according to claim 1, wherein a process gas consisting of the dry gas introduced into the dealdehydization container together with the plastic granules, and of the purge gas introduced into the dealdehydization container, is supplied together with a fresh gas added to yield the required amount of dry gas—through an outlet provided in the dealdehydization container—to a gas treatment unit which processes said gas to dry gas and supplies said gas to the plastic granules again downstream of the first separating device.

11. Method according to claim 1, wherein downstream of said first separating device and upstream of said crystallization zone, pressure is reduced appropriately to ensure a predetermined dew point of the dry gas.

12. Method according to claim 1, wherein starting from the first separating device and up to the dealdehydization container, a pressure higher than 2 bar is maintained in the dry gas and that pressure is then reduced downstream of the dealdehydization container, preferably to atmospheric pressure.

13. Method according to claim 12, wherein the pressure prevailing in the dealdehydization container is lower than 10 bar.

14. Method according to claim 1, wherein the pressure reduction downstream of the dealdehydization container is performed using a cell wheel lock or a lock or by means of an intermediate chamber having a slide valve at its inlet and a slide valve at its outlet, which valves are opened alternately.

15. Method according to claim 14, wherein during dealdehydization under pressure, the pressure prevailing in the dealdehydization container is maintained constant in the dew point range at atmospheric pressure of less than 0° C.

16. Method according to claim 1, wherein following dealdehydization, the plastic granulate is fed to an additional cooling zone having a cooling fluid where the plastic granulate is cooled to below 65° C., at a cooling fluid temperature of below 40° C.

17. Method according to claim 16, wherein the cooling fluid has a loading density of more than 30% by weight of plastic granules in the additional cooling zone.

18. Method according to claim 1, wherein the plastic granulate consists of a semi-crystalline thermoplastic polyester or copolyester, for example poly-ethylene terephthalate.

19. Method according to claim 9, wherein the dry gas is mixed with fresh gas in the gas processing unit.

* * * * *